United States Patent
Menne et al.

(10) Patent No.: US 11,834,015 B2
(45) Date of Patent: Dec. 5, 2023

(54) DRIVE TRAIN WITH A HYDRODYNAMIC RETARDER THAT CAN BE DECOUPLED AND HAS A DISPLACEMENT SENSOR

(71) Applicant: Voith Patent GmbH, Heidenheim (DE)

(72) Inventors: Achim Menne, Crailsheim (DE); Philipp Mueller, Schwaeb. Gmuend (DE); Dieter Laukemann, Frankenhardt (DE); Mirco Wassermann, Michelbach an der Bilz (DE)

(73) Assignee: Voith Patent GmbH, Heidenheim (DE)

( * ) Notice: Subject to any disclaimer, the term of this patent is extended or adjusted under 35 U.S.C. 154(b) by 9 days.

(21) Appl. No.: 17/611,663

(22) PCT Filed: May 13, 2020

(86) PCT No.: PCT/EP2020/063338
§ 371 (c)(1),
(2) Date: Nov. 16, 2021

(87) PCT Pub. No.: WO2020/229542
PCT Pub. Date: Nov. 19, 2020

(65) Prior Publication Data
US 2022/0194330 A1 Jun. 23, 2022

(30) Foreign Application Priority Data
May 16, 2019 (DE) ...................... 10 2019 112 832.3

(51) Int. Cl.
*B60T 1/087* (2006.01)
*B60T 10/02* (2006.01)
(Continued)

(52) U.S. Cl.
CPC .............. *B60T 1/087* (2013.01); *B60T 10/02* (2013.01); *F16H 47/06* (2013.01); *F16H 2061/0414* (2013.01)

(58) Field of Classification Search
CPC .......... B60T 1/087; B60T 10/02; F16D 67/02; F16D 67/04; F16D 67/03; F16D 48/062; F16D 48/064
See application file for complete search history.

(56) References Cited

U.S. PATENT DOCUMENTS

| | | | | |
|---|---|---|---|---|
| 3,460,656 A | * | 8/1969 | Swanson | F16D 48/064 192/48.618 |
| 2006/0207363 A1 | * | 9/2006 | Kuepper | F16H 61/2807 74/335 |

(Continued)

FOREIGN PATENT DOCUMENTS

| | | | | |
|---|---|---|---|---|
| DE | 102012004689 A1 | * | 9/2013 | ............. B60T 1/062 |
| DE | 102012007732 A1 | | 10/2013 | |

(Continued)

*Primary Examiner* — Thomas J Williams
(74) *Attorney, Agent, or Firm* — Laurence A. Greenberg; Werner H. Stemer; Ralph E. Locher

(57) ABSTRACT

A drive train has a hydrodynamic retarder including a rotating bladed rotor and bladed stator, forming a working chamber for hydrodynamic transmission of power from rotor to stator, a power input feeding drive power to the retarder, and a synchronized separating clutch connected between power input and rotor. The clutch has two clutch halves, friction elements contacting each other and mechanical blocking elements. The friction elements equalize rotational speed between clutch halves, and the blocking elements form-lockingly connect the clutch halves. The clutch has an actuator displaceable along a displacement travel, over a first distance bringing the friction elements into mutual contact, and a second distance adjoining the first distance to synchronize the friction elements and rotational (Continued)

speed for locking with the blocking elements. At least one displacement sensor directly or indirectly detects displacement travel by the actuator and/or position of the actuator on the displacement travel.

14 Claims, 2 Drawing Sheets

(51) Int. Cl.
*F16H 47/06* (2006.01)
*F16H 61/04* (2006.01)

(56) References Cited

U.S. PATENT DOCUMENTS

| | | | |
|---|---|---|---|
| 2016/0200302 A1* | 7/2016 | Sannelius | B60T 10/02 |
| | | | 188/291 |
| 2022/0194330 A1* | 6/2022 | Menne | F16D 57/04 |

FOREIGN PATENT DOCUMENTS

| | | | | |
|---|---|---|---|---|
| DE | 102013000239 A1 | | 7/2014 | |
| DE | 102013021237 A1 | | 7/2014 | |
| DE | 102015205851 A1 | * | 11/2015 | B60T 10/02 |
| EP | 1251050 A2 | | 10/2002 | |
| WO | WO-2015126313 A1 | * | 8/2015 | B60T 10/02 |
| WO | WO-2016209148 A1 | * | 12/2016 | B60T 1/087 |

* cited by examiner

DRIVE TRAIN WITH A HYDRODYNAMIC RETARDER THAT CAN BE DECOUPLED AND HAS A DISPLACEMENT SENSOR

FIELD AND BACKGROUND OF THE INVENTION

The present invention relates to a drivetrain with a hydrodynamic retarder that can be decoupled by means of a separating clutch in order to avoid idling losses during non-braking operation.

Hydrodynamic retarders are used in a drivetrain, for example a motor vehicle drivetrain, in particular a utility vehicle drivetrain, as concerns the present invention in particular, in order to brake the motor vehicle hydrodynamically without wear. For this purpose, the hydrodynamic retarder has a bladed rotor that rotates about an axis of rotation and a bladed stator, wherein in the context of the present invention the stator may fundamentally also be designed as a counter-rotor, and wherein the rotor and the stator together form a toroidal working chamber, which can be filled with a working medium in order to hydrodynamically transfer drive power from the rotor to the stator by means of a hydrodynamic working-medium circuit formed in the working chamber. This transfer of drive power causes the rotor to be braked without wear.

It is fundamentally possible to provide the rotor of the hydrodynamic retarder in a manner permanently coupled in the drivetrain, for example coupled to a transmission output shaft or a power take-off of a motor vehicle transmission, and to at least largely empty the working chamber of the working medium when switching over from braking operation to non-braking operation. However, even when the working chamber is emptied of the working medium, an undesired transfer of torque from the rotor to the stator is produced, this leading to a loss of power. It has therefore been proposed to decouple the hydrodynamic retarder completely from the drivetrain, that is to say the corresponding output shaft of the transmission or else of the motor, during non-braking operation by providing a separating clutch between a power input, via which drive power is conducted to the hydrodynamic retarder, and the rotor of the hydrodynamic retarder. Depending on the configuration of such a separating clutch, however, this can also create an undesirable drag loss in the open state, that is to say in the state in which the retarder is decoupled. As is described in DE 10 2012 007 732 A1, such losses can be greater than the losses that conventionally arise as a result of the co-rotation of the retarder rotor during non-braking operation. DE 10 2012 007 732 A1 therefore proposes a drivetrain of a motor vehicle, having a hydrodynamic retarder that can be decoupled via a separating clutch, wherein the separating clutch is designed as a synchronizable shift element that has at least one synchronizing ring and also a cone element, which compensates a rotational speed difference between the output shaft of the transmission and the drive shaft of the hydrodynamic retarder within the synchronization phase. Also provided is a sensor unit which detects an impermissible operating state, with the result that filling of the working chamber of the retarder can be interrupted and the synchronizing device of the shift element is reliably protected against damage and an impermissibly high degree of wear. The sensor unit monitors for example the respective rotational speeds or the positions of the transmission output shaft and of the retarder drive shaft and/or the positioning or the operating state of the synchronizing device.

Separating clutches, the effect of which is to synchronize with friction elements, are fundamentally subject to wear. Therefore, from a design perspective a wear reserve must be held available, within which the separating clutch has no functional losses owing to wear. If, by contrast, the wear reserve is exceeded, this can lead to functional losses through to total failure of the separating clutch. In this respect, the wear that actually occurs depends on the actuation of the separating clutch, in particular when the separating clutch is being closed. Closing the separating clutch quickly promotes wear, whereas closing the separating clutch slowly is unfavorable when the hydrodynamic retarder is being connected, since the braking power of the hydrodynamic retarder is provided at a corresponding delay.

SUMMARY OF THE INVENTION

The present invention is therefore based on the object of specifying a drivetrain having a hydrodynamic retarder that can be decoupled, in which the connection of the hydrodynamic retarder and the buildup of the braking torque generated by the hydrodynamic retarder takes place quickly, on the one hand, and on the other hand the wear in the separating clutch is kept low and a long service life of the separating clutch can be achieved.

The object according to the invention is achieved by a drivetrain having a hydrodynamic retarder which comprises a bladed rotor rotating about an axis of rotation and a bladed stator forming, together with the rotor, a working chamber for the hydrodynamic transmission of power from the rotor to the stator, a power input for supplying drive power to the hydrodynamic retarder, a separating clutch in a drive connection between the power input and the rotor of the hydrodynamic retarder, the separating clutch being constructed as a synchronized clutch with two clutch halves and with friction elements that can be brought into contact with one another and with mechanical blocking elements, the friction elements being configured to equalize the rotational speed between the coupling halves, and the blocking elements being configured to form-lockingly connect the two coupling halves to one another, the separating clutch including an actuator, displaceable along a displacement travel, which can be displaced over a first initial distance in order to bring the friction elements into mutual contact and can be displaced over a second distance that follows the first distance in order to synchronize the rotational speed of the two friction elements and thus of the coupling halves and to lock them to one another by using the blocking elements, and at least one travel sensor directly or indirectly detecting the displacement travel covered by the actuator and/or the position of the actuator on the displacement travel. The dependent claims describe advantageous and particularly expedient configurations of the invention. A method for operating a drivetrain according to the invention is also specified.

A drivetrain according to the invention has a hydrodynamic retarder which comprises a bladed rotor rotating about an axis of rotation and a bladed stator. As discussed, the stator may fundamentally also be designed as a counter-rotor, which is driven in a rotational direction counter to that of the rotor. However, such embodiments have not been implemented outside rail vehicles in practice.

The rotor and the stator together form a working chamber for the hydrodynamic transmission of power by means of a working-medium circuit.

The drivetrain has a power input for supplying drive power to the hydrodynamic retarder. The power input may be for example a transmission output shaft, in particular the main output shaft or a power take-off shaft of the transmission or of a drive motor. Depending on the choice of shaft, the retarder is a primary retarder that rotates as a function of the motor rotational speed, or a secondary retarder that rotates as a function of the vehicle speed in a vehicle.

According to the invention, a separating clutch which is positioned in a drive connection between the power input and the rotor of the hydrodynamic retarder is provided. The separating clutch is designed as a synchronized clutch with two clutch halves. At least two friction elements and mechanical blocking elements that can be brought into contact with one another are provided. The friction elements are configured to equalize, that is to say to synchronize, the rotational speed between the clutch halves when closing the separating clutch, and the blocking elements are configured to form-lockingly connect the two clutch halves to one another after synchronization.

The separating clutch has an actuator, displaceable along a displacement travel, which can be displaced over a first initial distance in order to bring the friction elements into mutual contact and can be displaced over a second distance that follows the first distance in order to synchronize the rotational speed of the two friction elements and thus of the coupling halves and to form-lockingly connect them to one another by means of the blocking elements.

According to the invention, at least one travel sensor which directly or indirectly detects the displacement travel covered by the actuator and/or the position of the actuator on the displacement travel is provided.

According to one embodiment of the invention, a control device is provided, to which the at least one travel sensor is connected and which is configured to compare the displacement travel detected by the travel sensor or the position detected by the travel sensor with a predefined reference travel or a predefined reference position, respectively, and, depending on the comparison, to output a warning message and/or trigger a situation in which the separating clutch is permanently held open or permanently held closed, depending on whether a connection of the retarder in the future is to be avoided or whether the retarder is to be activated or deactivated in the future only by filling the working chamber with and emptying the working chamber of the working medium.

According to a particularly preferred embodiment of the invention, a closed-loop or open-loop control device is provided which provides closed-loop or open-loop control of a displacement of the actuator along the displacement travel and is configured to bring about the displacement along the first distance with a first actuating force and to bring about the displacement along the second distance with a second actuating force, wherein the first actuating force is smaller than the second actuating force.

In particular, the first actuating force can be increased over the first distance with a first gradient and the second actuating force can be increased over the second distance with a second gradient, wherein the first gradient is preferably smaller than the second gradient. In comparison with known separating clutches, this makes it possible in particular to change what is known as the actuator-system travel, that is to say the distance (displacement travel) covered by the actuator of the separating clutch, which is necessary until the friction elements, which in particular each have a friction lining, come into contact. This initial contact of the friction elements, that is to say the position of the actuator at the end of the first distance and at the start of the second distance, is also referred to as the kiss point. The state of wear of the separating clutch can be determined from the detected position of the actuator at this kiss point and/or from the detected distance covered from a zero position to this kiss point, that is to say the extent of the first distance. If a position or a travel that is just before the wear reserve of the separating clutch is measured, a signal can be sent to a vehicle computer that indicates that maintenance is required on the separating clutch. When the wear reserve is exceeded, the separating clutch can accordingly be deactivated or permanently closed.

During the activation, that is to say during the closing of the separating clutch, the kiss point, that is to say the end of the first distance, can advantageously be approached only up to a predetermined speed or a predetermined actuating force by means of the closed-loop or open-loop control device. Therefore, the further movement of the actuator over the second distance preferably takes place following this with a higher force gradient and/or with a higher force. For switching over the closed-loop or open-loop control at the end of the first distance and at the start of the second distance, i.e. at the kiss point, it is expedient to detect the exact location of this transition point, in particular even if this point is displaced owing to wear on the separating clutch. The control device according to the invention may be configured to detect and to store this transition point and to correspondingly take into account the stored transition point during connection processes of the separating clutch in the future. The transition point can be detected, for example, by detecting the rotational speed of the two coupling halves or a rotational speed ratio between the two coupling halves and/or by detecting a torque applied to the first coupling half and/or to the second coupling half. The detection can in turn take place either directly or indirectly in each case.

The travel sensor can advantageously detect whether and/or when the two coupling halves have been form-lockingly connected, that is to say whether and/or when the blocking elements have form-lockingly connected the two coupling halves to one another. The travel sensor can supply a corresponding signal for this.

The detection of the form-locking connection can indicate the end of the coupling or the connection operation. From this point in time, the separating clutch is able to transmit the full braking torque that can be provided by the hydrodynamic retarder. Thus, from this point in time, the retarder can be (further) filled with the working medium in order to build up a corresponding braking torque.

It is particularly advantageous, if the form-locking connection is not established within a defined time segment from the start of activation, that is to say from the start of the closing of the separating clutch, a fault situation is established and the activation, that is to say the closing of the separating clutch, can be interrupted. In particular, at least when a fault situation is repeatedly established the separating clutch is prevented from activating in the future. It is possible to output a corresponding warning message when the fault situation is established or when the fault situation is established repeatedly.

According to an exemplary embodiment of a method according to the invention, the displacement travel covered, in particular starting from a predefined zero point, and/or the current position of the actuator is detected directly or indirectly by the travel sensor and is used to determine a state of wear of the separating clutch and/or a displacement of the actuator along the displacement travel as a function of the current position is brought about with a varying actuating force. In this respect, the current position may be detected directly by the travel sensor or may be determined from the displacement travel covered that is detected by the travel sensor, wherein both of these are to be understood as direct detection by the displacement sensor, by contrast to indirect detection by way of measured values from other sensors.

In the method according to the invention, the displacement of the actuator along the first distance may preferably be brought about with a comparatively smaller actuating force and/or a comparatively smaller actuating-force gradient than the displacement of the actuator along the second distance.

The invention is to be described by way of example below on the basis of an exemplary embodiment and the figures.

DETAILED DESCRIPTION OF THE INVENTION

Figure 1:
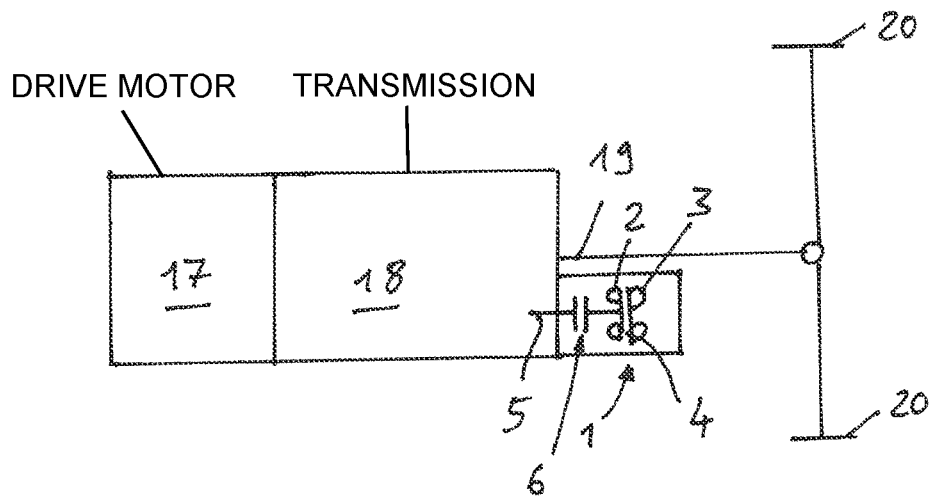
FIG. 1 shows a schematic illustration of a drivetrain according to the invention.

FIG. 1 schematically shows a drivetrain, for example a drivetrain of a utility vehicle, having a drive motor 17 and a transmission 18, which is driven by the drive motor 17 and has a transmission output shaft 19, which drives drive wheels 20. A power take-off shaft of the transmission 18 forms a power input 5 for a hydrodynamic retarder 1 having a rotor 2 and a stator 3, which together form a toroidal working chamber 4.

A separating clutch 6 is provided in the drive connection between the power input 5 and the rotor 2 of the hydrodynamic retarder 1 in order to completely decouple the hydrodynamic retarder 1 from the flow of drive power and thus to avoid idling losses.

In the closed state of the separating clutch 6, the transmission 18 drives the rotor 2 in rotation about an axis of rotation, whereas said rotor is stationary in the open state of the separating clutch 6.

Figure 2:
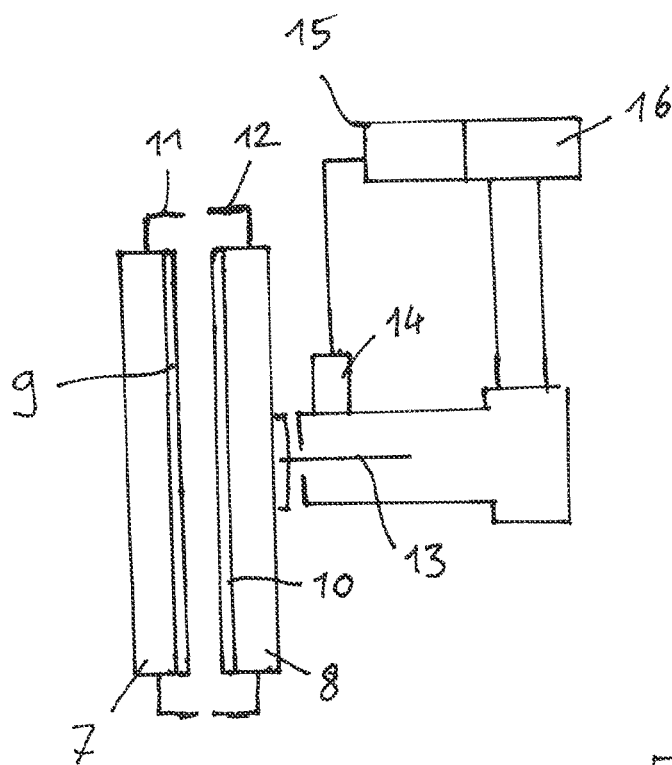
FIG. 2 shows a schematic illustration of a separating clutch according to the invention having an actuator.

As illustrated very schematically in FIG. 2, the separating clutch 6 has two clutch halves 7, 8 which, in the open state of the separating clutch 6, can rotate at different rotational speeds in relation to one another, and/or one of which in the open state of the separating clutch 6 may be stationary and the other of which may rotate. Each clutch half has at least one friction element 9, 10. Blocking elements 11, 12 are further provided, by means of which the two clutch halves 7, 8 can be form-lockingly connected to one another in the closed state of the separating clutch 6.

In order to open and close the separating clutch 6, an actuator 13 is provided which, starting from a zero position, first covers a first distance I and then covers a second distance II, this being explained below with reference to FIG. 3. When the actuator 13, starting from the zero position, has covered the first initial distance I, the friction elements 9, 10 come into mutual contact, the separating clutch 6 being located at what is known as the kiss point. If the actuator 13 is then displaced further, the two coupling halves 7, 8 are synchronized and the separating coupling 6 is closed in a form-locking manner by means of the blocking elements 11, 12.

A travel sensor 14 which detects the displacement travel w covered by the actuator 13 and/or the position of the actuator 13 on the displacement travel w is provided. The travel sensor 14 is connected to a control device 15, which may be designed in addition to or integrally with the closed-loop or open-loop control device 16. That is to say, a common device can assume the function of the control device 15 and the function of the closed-loop or open-loop control device 16.

The travel detected by the travel sensor 14 may also be the displacement of a sliding sleeve on which the actuator is positioned, with the result that the travel actually covered by the sliding sleeve is recorded. Described in general, the travel of the sliding sleeve can be determined indirectly via the travel of the actuator.

As a function of the position of the actuator 13 that is detected by the travel sensor 14 or as a function of the detected displacement travel w covered by the actuator 13, the control device 15 controls the output of a warning message and/or whether the separating clutch 6 is permanently held open or held closed, if, specifically in a comparison performed by the control device 15, it is established that the detected displacement travel w and/or the detected position deviates from a predefined reference value and/or a predefined reference position, which means that proper functioning of the separating clutch 6 is at least at risk.

The closed-loop or open-loop control device 16 controls the displacement of the actuator 13 via a corresponding actuator drive, in particular preferably in such a way that the displacement along the first distance I takes place with a first actuating force and the displacement along the second distance II takes place with a second actuating force which deviates from the first actuating force, wherein the first actuating force is in particular smaller than the second actuating force.

Figure 3:
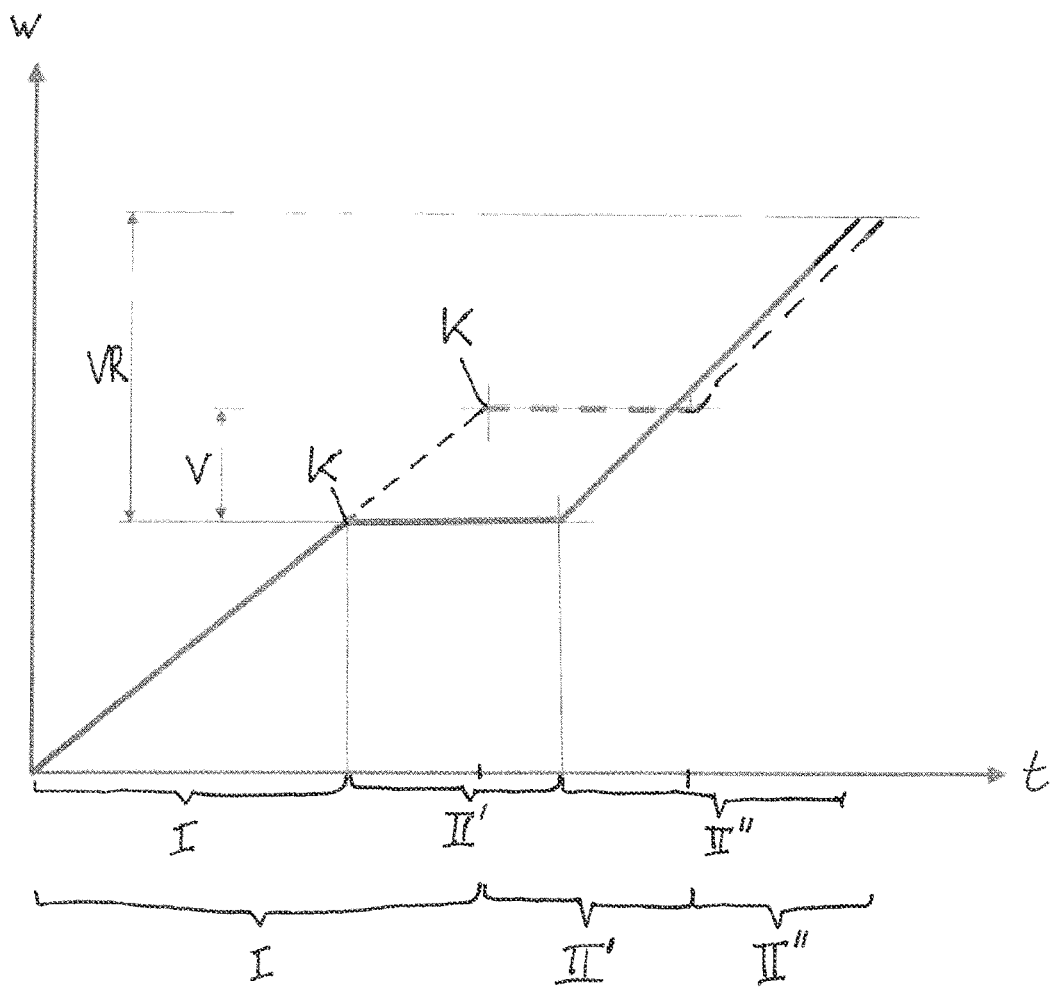
FIG. 3 shows a travel-time diagram in accordance with which the closed-loop or open-loop control device for the separating clutch preferably works.

FIG. 3 illustrates an example of a travel-time diagram for the actuator 13 (see FIG. 2). The time t of the displacement of the actuator 13 is illustrated as the abscissa, the displacement travel w as the ordinate.

During a closing operation of the separating clutch 6 (see FIG. 2), the actuator 13 is displaced, starting from a zero point, over the first initial distance I until the separating clutch 6 reaches the kiss point. As can be seen, in this respect the length of the first distance I varies over the service life of the separating clutch 6. The first distance I becomes greater as the wear of the friction elements 9, 10 increases. This is illustrated as a dashed line in FIG. 3. Furthermore, the current wear is denoted by V and what is known as the wear reserve is denoted by VR. The kiss point is denoted by K, in one instance when the separating clutch 6 is new and in one instance after the separating clutch 6 has been worn to a certain extent.

When the actuator 13 has covered the distance I and is displaced further, it covers the second distance II, over which the synchronization (II') and the form-locking (II") of the separating clutch 6 takes place. The sections II' and II" may thus directly follow one another, but may also at least partially overlap.

Over the first distance I, the actuator 13, as explained, may be actuated with a different force in comparison with actuation over the second distance II.

LIST OF REFERENCE SIGNS

1 Hydrodynamic retarder
2 Rotor
3 Stator

4 Working chamber
5 Power input
6 Separating clutch
7 Clutch half
8 Clutch half
9 Friction element
10 Friction element
11 Blocking element
12 Blocking element
13 Actuator
14 Travel sensor
15 Control device
16 Closed-loop or open-loop control device
17 Drive motor
18 Transmission
19 Transmission output shaft
20 Drive wheels
w Displacement travel
t Time
V Wear
VR Wear reserve
K Kiss point
I First distance
II Second distance

The invention claimed is:

1. A drivetrain, comprising a hydrodynamic retarder including:
   a bladed rotor rotating about an axis of rotation and a bladed stator, said stator and said rotor together forming a working chamber for a hydrodynamic transmission of power from said rotor to said stator;
   a power input for supplying drive power to the hydrodynamic retarder;
   a separating clutch in a drive connection between said power input and said rotor of the hydrodynamic retarder;
   said separating clutch constructed as a synchronized clutch with two clutch halves, mechanical blocking elements and friction elements to be brought into contact with one another and with said mechanical blocking elements, said friction elements configured to equalize a rotational speed between said two clutch halves, and said blocking elements configured to form-lockingly connect said two clutch halves to one another;
   said separating clutch including an actuator displaceable along a displacement travel, said actuator configured to be displaced over a first initial distance to bring said friction elements into mutual contact and to be displaced over a second distance, following said first distance, to synchronize a rotational speed of said two friction elements and of said two clutch halves and to lock said two clutch halves to one another by using said blocking elements;
   at least one travel sensor directly or indirectly detecting at least one of said displacement travel covered by said actuator or a position of said actuator along said displacement travel; and
   a control device displacing said actuator along said displacement travel with a varying actuation force, said control device varying said actuation force as a function of a current position of said actuator along said displacement travel based on a signal from said at least one travel sensor;
   said control device being connected to said at least one travel sensor, said control device configured to compare at least one of said displacement travel detected by said travel sensor or said detected position with at least one of a predefined reference travel or a predefined reference position, and said control device, depending on the comparison, configured to at least one of output a warning message or trigger a situation in which said separating clutch is permanently held open or held closed.

2. The drivetrain according to claim 1, wherein said control device includes a closed-loop or open-loop control device providing closed-loop or open-loop control of a displacement of said actuator along said displacement travel, said closed-loop or open-loop control device configured to bring about said displacement along said first distance with a first actuating force and to bring about said displacement along said second distance with a second actuating force, said first actuating force being smaller than said second actuating force.

3. The drive train according to claim 2, wherein said first actuating force is increased with a first gradient, said second actuating force is increased with a second gradient, and said first gradient is smaller than said second gradient.

4. A drivetrain, comprising a hydrodynamic retarder including:
   a bladed rotor rotating about an axis of rotation and a bladed stator, said stator and said rotor together forming a working chamber for a hydrodynamic transmission of power from said rotor to said stator;
   a power input for supplying drive power to the hydrodynamic retarder;
   a separating clutch in a drive connection between said power input and said rotor of the hydrodynamic retarder;
   said separating clutch constructed as a synchronized clutch with two clutch halves, mechanical blocking elements and friction elements to be brought into contact with one another and with said mechanical blocking elements, said friction elements configured to equalize a rotational speed between said two clutch halves, and said blocking elements configured to form-lockingly connect said two clutch halves to one another;
   said separating clutch including an actuator displaceable along a displacement travel, said actuator configured to be displaced over a first initial distance to bring said friction elements into mutual contact and to be displaced over a second distance, following said first distance, to synchronize a rotational speed of said two friction elements and of said two clutch halves and to lock said two clutch halves to one another by using said blocking elements;
   at least one travel sensor directly or indirectly detecting at least one of said displacement travel covered by said actuator or a position of said actuator along said displacement travel; and
   a control device displacing said actuator along said displacement travel with a varying actuation force, said control device varying said actuation force as a function of a current position of said actuator along said displacement travel based on a signal from said at least one travel sensor;
   said control device including a closed-loop or open-loop control device providing closed-loop or open-loop control of a displacement of said actuator along said displacement travel, said closed-loop or open-loop control device configured to bring about said displacement along said first distance with a first actuating force and to bring about said displacement along said second distance with a second actuating force, said first actuating force being smaller than said second actuating force.

5. The drive train according to claim 4, wherein said first actuating force is increased with a first gradient, said second actuating force is increased with a second gradient, and said first gradient is smaller than said second gradient.

6. A method for operating a drivetrain, the method comprising the steps of:
providing a drivetrain comprising a hydrodynamic retarder including:
a bladed rotor rotating about an axis of rotation and a bladed stator, said stator and said rotor together forming a working chamber for a hydrodynamic transmission of power from said rotor to said stator;
a power input for supplying drive power to the hydrodynamic retarder;
a separating clutch in a drive connection between said power input and said rotor of the hydrodynamic retarder;
said separating clutch constructed as a synchronized clutch with two clutch halves, mechanical blocking elements and friction elements to be brought into contact with one another and with said mechanical blocking elements, said friction elements configured to equalize a rotational speed between said two clutch halves, and said blocking elements configured to form-lockingly connect said two clutch halves to one another;
said separating clutch including an actuator displaceable along a displacement travel, said actuator configured to be displaced over a first initial distance to bring said friction elements into mutual contact and to be displaced over a second distance, following said first distance, to synchronize a rotational speed of said two friction elements and of said two clutch halves and to lock said two clutch halves to one another by using said blocking elements; and
at least one travel sensor directly or indirectly detecting at least one of said displacement travel covered by said actuator or a position of said actuator along said displacement travel;
using said travel sensor to directly or indirectly detect at least one of said displacement travel covered by said actuator or a current position of said actuator along said displacement travel; and
using at least one of said displacement travel covered by said actuator or said current position of said actuator detected by said travel sensor to determine a state of wear of said separating clutch.

7. The method for operating a drivetrain according to claim 6, which further comprises bringing about said displacement of said actuator along said displacement travel as a function of said detected current position with a varying actuation force.

8. The method according to claim 7, which further comprises bringing about said displacement of said actuator along said first distance with at least one of a smaller actuating force or a smaller actuating-force gradient than said displacement of said actuator along said second distance.

9. The method according to claim 6, which further comprises using said travel sensor to detect a form-locking connection of said two clutch halves by using said blocking elements based on said covered displacement travel.

10. The method according to claim 9, which further comprises increasingly filling said working chamber of the hydrodynamic retarder with working medium only after detecting said form-locking connection.

11. A method for operating a drivetrain, the method comprising the steps of:
providing a drivetrain comprising a hydrodynamic retarder including:
a bladed rotor rotating about an axis of rotation and a bladed stator, said stator and said rotor together forming a working chamber for a hydrodynamic transmission of power from said rotor to said stator;
a power input for supplying drive power to the hydrodynamic retarder;
a separating clutch in a drive connection between said power input and said rotor of the hydrodynamic retarder;
said separating clutch constructed as a synchronized clutch with two clutch halves, mechanical blocking elements and friction elements to be brought into contact with one another and with said mechanical blocking elements, said friction elements configured to equalize a rotational speed between said two clutch halves, and said blocking elements configured to form-lockingly connect said two clutch halves to one another;
said separating clutch including an actuator displaceable along a displacement travel, said actuator configured to be displaced over a first initial distance to bring said friction elements into mutual contact and to be displaced over a second distance, following said first distance, to synchronize a rotational speed of said two friction elements and of said two clutch halves and to lock said two clutch halves to one another by using said blocking elements; and
at least one travel sensor directly or indirectly detecting at least one of said displacement travel covered by said actuator or a position of said actuator along said displacement travel;
using said travel sensor to detect said current position of said actuator along said displacement travel; and
bringing about said displacement of said actuator along said displacement travel as a function of said detected current position with a varying actuation force.

12. The method according to claim 11, which further comprises bringing about said displacement of said actuator along said first distance with at least one of a smaller actuating force or a smaller actuating-force gradient than said displacement of said actuator along said second distance.

13. The method according to claim 11, which further comprises using said travel sensor to detect a form-locking connection of said two clutch halves by using said blocking elements based on a covered displacement travel.

14. The method according to claim 13, which further comprises increasingly filling said working chamber of the hydrodynamic retarder with working medium only after detecting said form-locking connection.

\* \* \* \* \*